US005761817A

United States Patent [19]

Whited et al.

[11] Patent Number: 5,761,817

[45] Date of Patent: Jun. 9, 1998

[54] ROTARY HAND KNIFE

[75] Inventors: Jeffrey A. Whited, Amherst; Robert L. Leimbach, Wakeman, both of Ohio

[73] Assignee: Bettcher Industries, Inc., Birmingham, Ohio

[21] Appl. No.: 730,814

[22] Filed: Oct. 17, 1996

[51] Int. Cl.$^{6}$ .................................................. A22C 17/04

[52] U.S. Cl. .................................................. 30/276; 30/347

[58] Field of Search .............................. 30/276, 347, 389

[56] References Cited

U.S. PATENT DOCUMENTS

| | | | |
|---|---|---|---|
| 4,236,531 | 12/1980 | McCullough | 30/276 |
| 4,363,170 | 12/1982 | McCullough | 30/276 |
| 4,439,924 | 4/1984 | Bettcher | 30/276 |
| 4,509,261 | 4/1985 | Bettcher | 30/276 |
| 4,575,938 | 3/1986 | McCullough | 30/276 |
| 4,637,140 | 1/1987 | Bettcher | 30/276 |

*Primary Examiner*—Douglas D. Watts
*Attorney, Agent, or Firm*—Watts, Hoffmann, Fisher & Heinke Co., L.P.A.

[57] ABSTRACT

A hand knife is disclosed comprising a handle assembly, a ring-like blade housing carried by and projecting from the handle assembly, a ring blade carried by the housing, a blade drive transmission, and a blade retention assembly. The housing defines an annular blade receiving groove opening in an axially facing side. The ring blade is supported in the housing with a cutting edge projecting from the groove. The blade retention assembly comprises a flexible blade keeper extending along the axially facing housing side and about the blade and a connector for securing the blade keeper to the housing and handle assembly. The keeper is disposed in supporting relationship with the blade along the housing face diametrically opposite the handle assembly. The keeper flexes to facilitate ring blade removal and replacement.

12 Claims, 3 Drawing Sheets

ROTARY HAND KNIFE

FIELD OF THE INVENTION

The present invention relates to power driven rotary blade hand knives used in commercial meat cutting where the blades must frequently be removed and replaced for sharpening, and more particularly to an improved system of blade retention.

1. Background

Use of power operated rotary blade hand knives in meat packing plants and other commercial meat cutting environments is widespread. These knives comprise a handle, a blade housing detachably connected to the housing, a ring blade supported by the blade housing for rotation about the ring axis and a drive transmission between the handle and the blade. The drive transmission can be of any suitable design but is usually a pinion gear journaled in the handle and running in mesh with a ring gear cut in the ring blade. The gear transmission can be powered from any suitable power source such as an electric motor in the handle, a flex shaft extending into the handle, or an air motor in the handle supplied from a pressurized air source.

Optimum operation of these knives requires rather frequent blade sharpening. Merely steeling such knife blades does not always produce an efficient blade edge. The blade must be removed from the knife, sharpened and replaced.

2. The Prior Art.

Rotary blade power driven knives have been constructed with rotary, ring-like blades supported by blade housings that were detachably connected to knife handles. In some such knives the blade housing was formed by a split annulus having a radially inwardly projecting flange, or lip, supporting the blade ring. The blade could be removed only by detaching the blade housing from the handle and spreading the blade housing split ends. The ends were spread apart sufficiently to permit removing the blade from the blade supporting flange. Other knives employed an unsplit blade housing associated with a complex blade clamping mechanism. The blade clamping mechanism comprised a clamping shoe and associated retaining arms, retention screws and set screws. Removing the blade required removing screws to retract the clamping shoe. Replacing the blade required replacing and readjusting the clamping shoe.

The constructions of these knives, although effective, did not encourage blade removal and replacement by operators in the course of a working shift. Blade removal and replacement took too much time. Accordingly the knives often continued to be used when less than optimally sharp.

Rotary blade power driven knives constructed so that blades could be removed and replaced quickly have been suggested by the prior art patents. See, for example, U.S. Pat. No. 4,509,261 issued Apr. 9, 1985. That patent disclosed an unsplit blade housing supporting a ring blade in an axially opening housing groove. The blade and groove were constructed so that the blade was snugly received in the groove yet free to rotate with little friction and also free to slide axially clear from the groove. A yoke-like blade retainer, detachably secured to the handle, prevented blade displacement from the groove, while enabling relatively easy blade removal and replacement.

The blade retainer provided an enlarged flat body portion and two short fingers each extending from the handle a short distance along the blade outer periphery at the juncture of the blade and blade housing. The body portion was firmly clamped to the handle by screws and the fingers extended oppositely from the handle cantilever fashion to their projecting ends. The blade retainer subtended an arc of substantially less than 180° about the blade housing. Loosening the retainer body clamping screws permitted the retainer fingers to tip away from the blade housing, releasing the blade from its groove.

This proposal markedly speeded blade removal and replacement. But in some circumstances meat fragments were carried by the blade to the projecting finger ends. The fragments tended to become impacted between the finger end and the blade. As use continued, more meat fragments were jammed into the space between the finger and blade, increasing the frictional resistance to blade rotation and slowing the blade. This build-up was gradual and thus not particularly noticeable to the knife user.

Furthermore, the portion of the blade diametrically opposite the retainer body location was not supported by the retainer and tended to shift axially in the blade housing groove depending on forces applied to the knife during use.

The present invention provides a new and improved power operated rotary hand knife which is so constructed and arranged that removing and replacing the knife blade may be accomplished quickly and easily yet the blade remains fully supported during use and gradual build-ups of meat fragments which could otherwise interfere with proper blade rotation during cutting are obviated.

SUMMARY OF THE INVENTION

A hand knife constructed according to a preferred embodiment of the invention comprises a handle assembly, a ring-like blade housing carried by and projecting from the handle assembly, a ring blade carried by the housing, a blade drive transmission, and a blade retention assembly. The housing is disposed about a central axis and has an axially facing side with an annular blade receiving groove defined in it. The groove extends about the axis and opens in the axially facing side. The ring blade is disposed about the central axis and supported in the housing with a cutting edge projecting generally axially from the groove. The blade drive transmission drives the blade relative to the housing about the axis. The blade retention assembly comprises a flexible blade keeper extending along the axially facing housing side and about the blade in excess of 180 degrees around the axis. The blade retention assembly further comprises a connector for securing the blade keeper in substantially fixed relationship to the housing and handle assembly with the keeper disposed in supporting relationship with the blade along the housing face diametrically opposite the handle assembly. The blade keeper flexes to facilitate ring blade removal and replacement.

In a preferred embodiment of the invention the blade keeper is cantilevered to the handle assembly and a connector secures the blade keeper to the handle. The blade keeper substantially encircles the blade and extends along the axially facing housing side in supporting relationship with the ring blade for maintaining the ring blade properly positioned in the housing groove while avoiding blade jams due to meat fragment build ups.

Other features and advantages of the invention will become apparent from the following description of a preferred embodiment made in reference to the accompanying drawings, which form a part of the specification.

BRIEF DESCRIPTION OF THE DRAWINGS

FIG. 2; and, FIG. 5 is an elevational view seen approximately from the plane indicated by the line 5—5 of FIG. 3 with parts broken away and parts illustrated in cross section.

DESCRIPTION OF THE BEST KNOWN MODE FOR PRACTICING THE INVENTION

Figure 2:
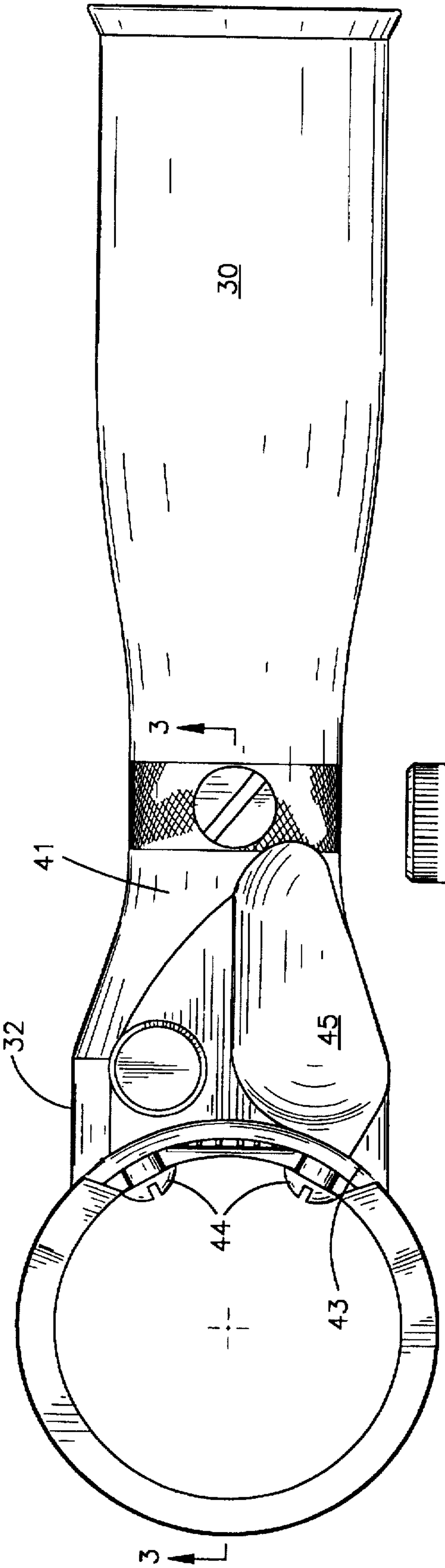
FIG. 2 is a top plan view of the knife illustrated in FIG. 1.
Figure 3:
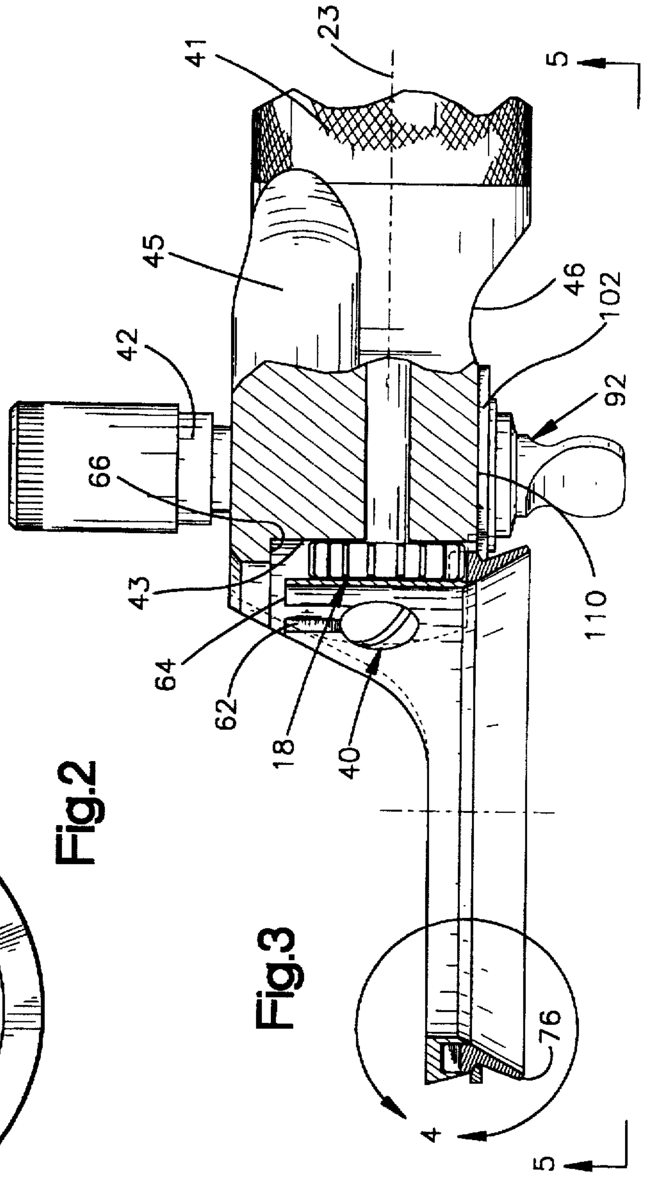
FIG. 3 is an enlarged fragmentary view seen approximately from the plane indicated by the line 3—3 of FIG. 2.

A hand knife 10 embodying the invention is illustrated in the drawings. The knife 10 comprises a handle assembly 12, a ring-like blade housing 14 carried by and projecting from the handle assembly, a ring blade 16 carried by the housing 14, a blade drive transmission 18 (FIGS. 2 and 3), and a blade retention assembly 20. The blade housing 14 and blade 16 are disposed about a central axis 22. The blade 16 is driven about the axis relative to the blade housing 14 by the drive transmission 18.

The knife 10 is of a type particularly adapted for use in meat packing, or the like, for trimming or boning carcasses. The knife 10 is grasped by an attendant, and turned "on" so that the blade 16 is driven. The attendant works the knife along part of a carcass to trim or bone it. The knife 10 is shown for illustrative purposes since the invention can be embodied in rotary knives adapted for other tasks.

The illustrated knife is operated by an electric motor (not illustrated) housed in the handle assembly 12 and connected to a suitable power supply via a power line(not illustrated). While an electric motor driven knife is illustrated, it should be appreciated that other kinds of drives may be employed, for example, a remote electric motor or air motor with a flexible drive shaft extending to the knife; a handle mounted air motor with pressurized air supplied through a flexible hose, etc.

The handle assembly 12 houses the blade drive transmission 18, serves as a support for the remaining knife components and provides a comfortable hand piece for the attendant. The preferred handle assembly 12 comprises a manually grippable handle 30 and a head piece 32 for securing the blade housing and blade to the handle assembly.

The illustrated handle 30 is an elongated element shaped so that it can be manually gripped for manipulating the knife over an extended period of time with the knife operator experiencing minimum discomfort or fatigue. In the illustrated knife the handle 30 is generally cylindrical, tubular and projects from the head piece 32 along a longitudinal axis 33. The blade driving motor is mounted in the tubular handle 30. The illustrated handle 30 is a light metal casting formed continuously with the head piece 32.

The head piece 32 anchors the blade housing 14 and blade 16 to the handle assembly. The illustrated head piece comprises a blade housing seat assembly 40, a shank 41 extending from the seat assembly to the handle 30 and a lubrication system 42. The seat assembly 40 comprises a semicircular blade housing seat 43 and connectors 44 for securing the blade housing 14 to the seat. In the illustrated knife, two connectors, each formed by a clamping screw threaded into a respective tapped hole in the seat 43, securely clamp the blade housing to the seat 43.

The head piece 32 is ergonomically shaped to minimize operator fatigue. The shank 41 is formed by a necked down section of the handle casting extending between the handle 30 and the head piece. The shank defines an arcuately tapering, tubular handle section converging smoothly toward the head piece. A contoured thumb nitch 45 is formed by a concavity extending from the shank into one side of the head piece. The nitch 45 is formed in part by a wall-like barrier between the nitch and the blade housing 14 which blocks sliding thumb movement into the blade area. A concave finger nitch 46 is formed on the opposite side of the knife. The nitches 45, 46 enable positive, comfortable handle gripping.

The lubrication system 42 comprises a lubricant fitting and a lubricant channel extending in the housing seat assembly from the blade housing to the fitting. The fitting comprises a tubular fitting body 50 screwed into the housing seat assembly and a cup-like reservoir cap 52 screwed onto the fitting body. Lubricant is introduced into a chamber formed between the reservoir cap 52 and body 50. The cap is screwed down onto the body to force lubricant through the channel to the knife blade and blade housing. A compression spring (not shown) in the lubricant chamber reacts between the cap and fitting body for maintaining the cap frictionally secure on the fitting. The lubricant is composed of an edible material.

The blade housing 14 firmly supports the blade 16 against forces applied during the meat trimming operations yet insures low friction blade rotation about the axis 22 and facilitates easy blade removal and replacement. The blade housing 14 comprises a thin circularly curved blade support 54 (FIG. 1) projecting away from the handle assembly 12 in a plane normal to the axis 22 and a semi-cylindrical base 56 extending axially from a portion of the blade support periphery for securing the blade housing to the head piece. The preferred and illustrated housing 14 is a continuous ring.

The blade support 54 receives the blade 16 in an axially opening groove 58 (FIG. 4) that enables easy blade removal and replacement. The blade support 54 has an axial side **54*a* facing away from the direction of extent of the base 56. The blade-receiving groove 58 is defined in the blade support. The groove 58 opens axially in the side 54*a* and extends substantially completely about the blade support 54. The blade is inserted in, and removed from, the support 54 by sliding it axially into and out of the groove. The groove 58 has a generally rectilinear cross sectional shape with the blade support 54 defining a generally "U" shaped cross section. The groove 58 receives the ring blade 16** rather loosely with little friction. The lubricant channel opens into the groove to further assure efficient running of the blade by introducing lubricant into the groove.

The enlarged blade housing base 56 is clamped against the seat 43 by the screws 44. The illustrated base 56 defines parallel axial slots 62 each aligned with a respective screw 44 (See FIGS. 2 and 3). The slots 62 open in an axial base end 64 remote from the blade support 54. The base 56 is assembled to the head piece by loosening the screws 44 somewhat, sliding the base 56 axially onto the seat 43 so that the screws 44 slip into the slots 62, and retightening the screws when the blade housing is properly positioned on the seat 43. In the illustrated knife 10 the seat 43 defines an axial stop shoulder 66 engaging the base end 64 when the base is properly positioned on the seat.

The ring blade 16 is driven about the axis 22 relative to the supporting housing 14 as the knife moves through the meat being trimmed. The ring blade 16 is a continuous, circular annulus centered on the axis 22. A blade body section 70 is disposed in the groove 58 and a cutting blade section 72 projects out of the groove from the body section 70 (See FIG. 4).

Figure 4:
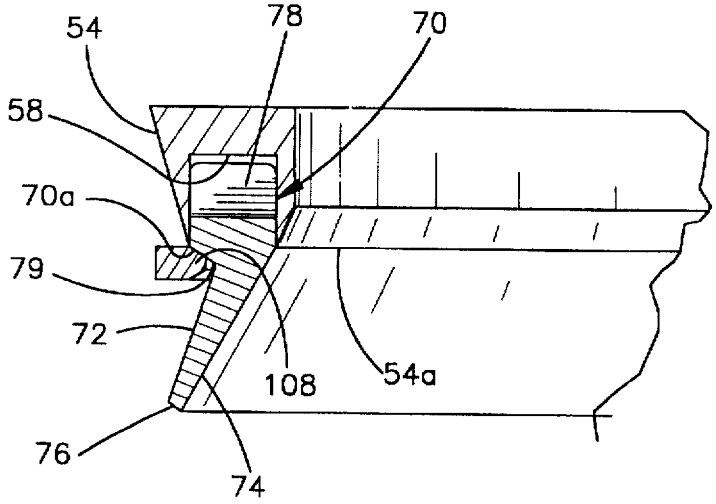
FIG. 4 is an enlarged cross sectional view of the portion of the hand knife with the line 4 of FIG. 3.

The blade body section 70 is slidably disposed in the groove 58 and forms a ring gear with gear teeth 78 projecting axially parallel to the axis 22 toward the closed groove end. The blade body section 70 has a radially outer, frustoconical surface 70*a* extending radially outwardly from the small end of the frustoconical skirt-like blade section 72 so that a waist 79 is formed at the juncture of the sections 70, 72 (FIG. 4). The waist 79 extends about the blade periphery immediately adjacent the housing face 54*a*. The gear teeth 78 are disposed within the groove 58 except for a short span where the groove intersects a housing base cavity 80 where drive is transmitted to the blade ring gear.

The cutting blade section 72 forms a frustoconical skirt projecting radially outwardly from the groove 60, diverging proceeding away from the blade housing 14. The blade cutting edge is formed by the intersection of the radially inner, conical blade wall surface 74 and an annular face 76 extending between the inner and outer skirt surfaces at the projecting end of the blade skirt (See FIG. 4).

The blade drive transmission 18 drives the ring blade about the axis 22 relative to the blade housing. In the illustrated knife 10 the drive transmission 18 comprises a spur gear 84 in the cavity 80. The gear 4 is journaled in the handle assembly 12 with its teeth and the blade teeth 78 meshed. The gear 84 is directly driven from a drive shaft in the handle. The cavity 80 is formed by a rectilinear groove extending axially through the base 56 and ring 54. The groove side walls extend closely adjacent the gear 84 and the upper end of the groove is covered, and closed, by the shoulder 66. The lower end of the cavity groove opens into the groove 58 and is closed by the blade body 78.

Figure 1:
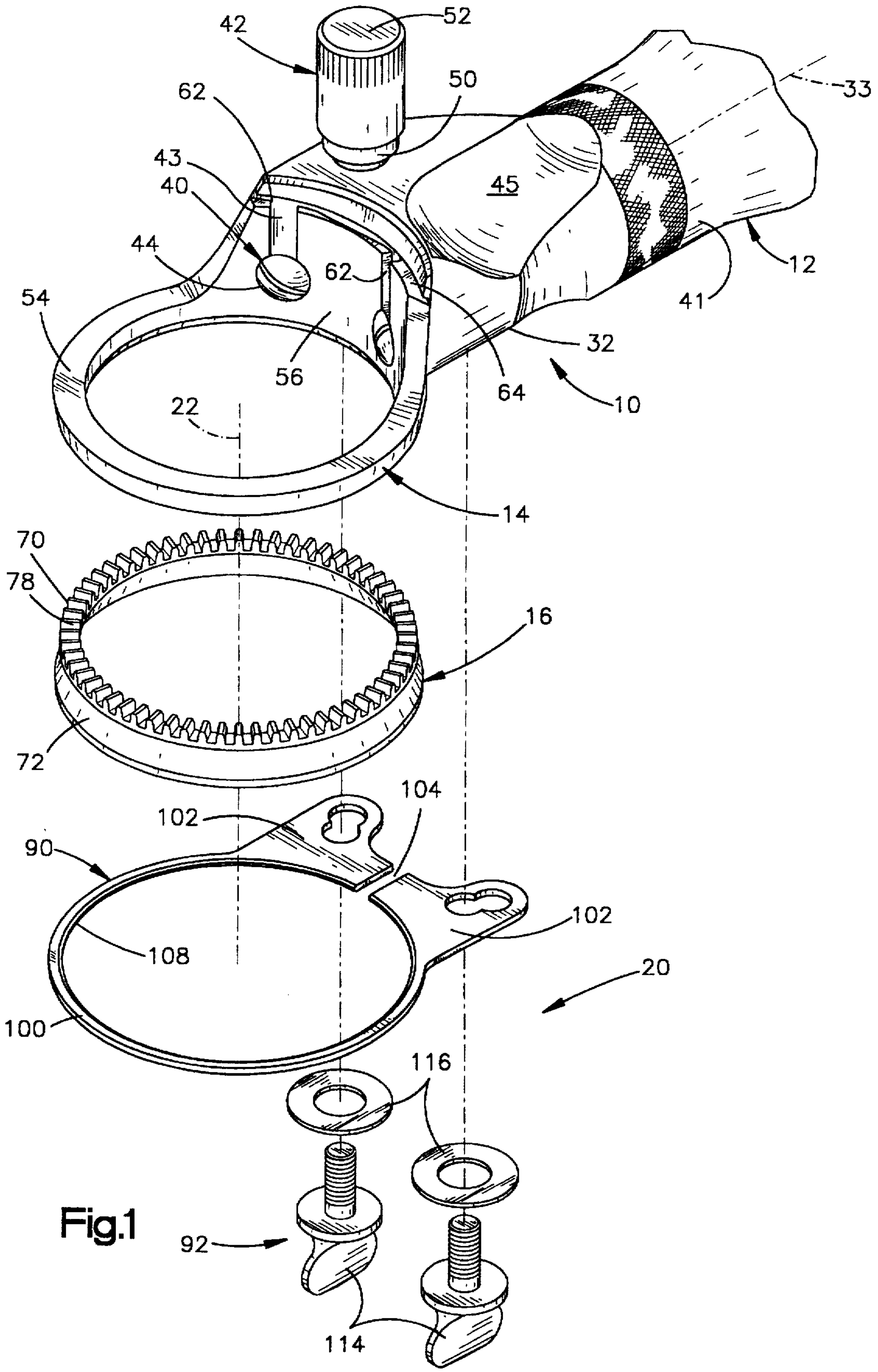
FIG. 1 is an exploded perspective view of a hand knife constructed according to the invention with portions broken away.
Figure 5:
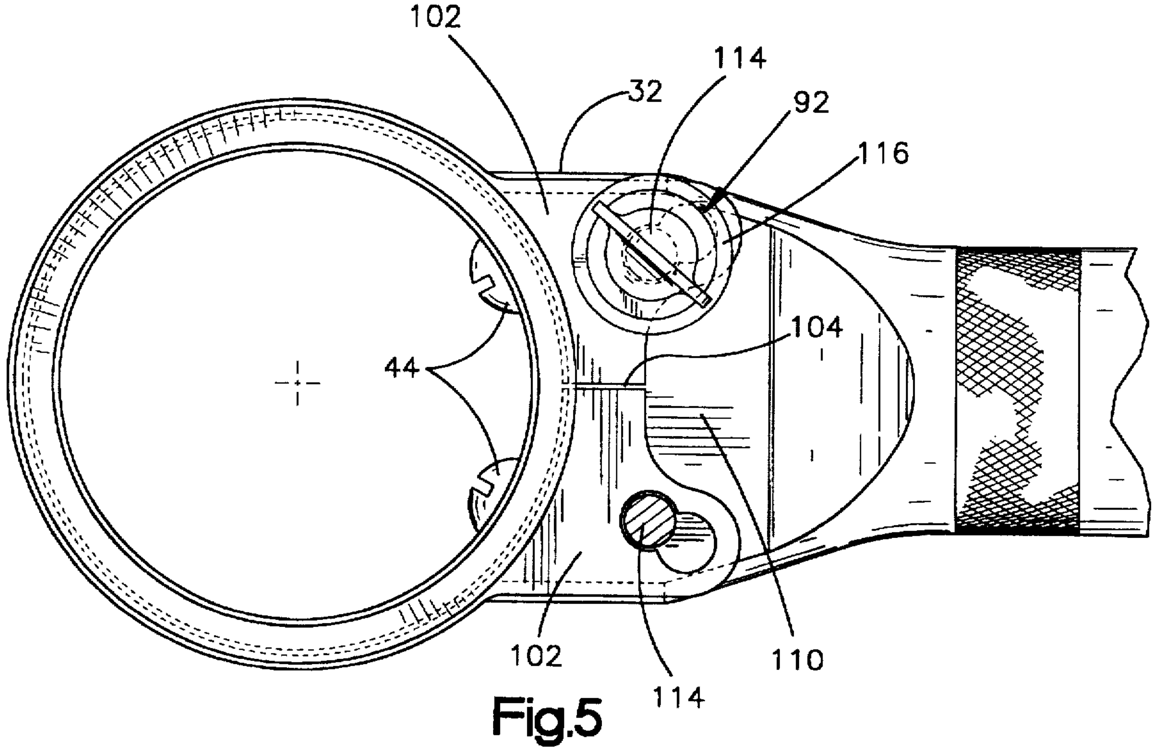

The blade retention assembly 20 is illustrated in FIGS. 1 and 5. The assembly 20 secures the ring blade 18 in position during use, yet facilitates blade removal and replacement. The blade retention assembly comprises a flexible blade keeper 90 and connector structure 92 for detachably securing the blade keeper in substantially fixed relationship to the blade and blade housing.

The blade keeper 90 extends along the axially facing housing side 54*a* more than 180 degrees about the blade axis 22. The keeper 90 is relatively rigid and stiffly resists deflection in a direction parallel to the axis 22. The keeper 90 is disposed in supporting relationship with the ring blade along the blade housing face 54*a* diametrically opposite from the head piece 32. Any tendency for the ring blade to sag, or droop, out of the groove 58 during use is stiffly resisted by the keeper 90, which engages the outwardly flaring blade body surface 70*a* (FIG. 4) adjacent the waist 79 whenever the blade tends to shift out of the groove. Locating the keeper along the blade waist 79 through greater than 180 degrees of its periphery thus prevents the blade from being dislocated from the groove.

The blade keeper 90 flexes in a plane transverse to the axis 22, shifting the keeper out of supporting relationship with the ring blade for facilitating blade removal and replacement. The keeper 90 comprises a spring band cantilevered to the handle by the connector structure 92. The illustrated spring band curves to conform to the curvature of the blade when the spring band is in its relaxed state. The spring band resiliently flexes away from the blade, resiliently enlarging its girth sufficiently to enable blade removal and replacement.

The preferred and illustrated keeper 90 is so constructed and arranged that meat fragments and particles picked up on the outer blade periphery do not become jammed between the blade periphery and the keeper. The illustrated keeper is a thin split band which substantially completely encircles the ring blade. The band comprises a narrow circularly curved blade retainer spring 100 and anchoring pads 102 respectively formed at the spring ends adjacent the split 104. The band has no projecting edges adjacent the blade against which meat fragments could be propelled by the blade.

The retainer spring 100 defines a generally rectilinear cross sectional shape with the inner periphery formed by chamfered faces defining a nose section 108 (FIG. 4) between the chamfers. One of the chamfers confronts the frustoconical outer blade body surface 70*a* to prevent blade displacement from the groove.

The connector structure 92 detachably secures the anchoring pads 102 to the head piece 32. The connector structure comprises a mounting face 110 formed on the head piece 32 and clamp assemblies for clamping the anchoring pads to the face 110. The preferred clamping assemblies are identical and each comprises a thumb screw 114 and a thrust washer 116. The thumb screw extends through a hole in the associated pad 102 and is threaded into a tapped hole in the face 110. The thrust washer 116 is resiliently compressed between a collar on the thumb screw and the pad 102 when the thumb screw is tightened down. The thrust washer is preferably in the form of a bellville spring so that the thumb screw 114 is maintained in tension against the tapped threads during use of the knife and vibrations are ineffective to loosen the thumb screws.

In the illustrated knife the anchoring pads 102 and the band 100 are disposed in a common plane normal to the axis 22. The head piece mounting face is coplanar with the pads. The pads and mounting face are clamped firmly together across the full areas of the pads 102, which are relatively wide and extend radially outwardly from the band 100. The pads and mounting face are clamped together across these relatively large areas to assure solid support of the cantilevered retainer 90 when the clamping assemblies are in place.

Removing either clamping assembly, or both, enables manual separation of the pads 102 and consequent spring band expansion. The expanded spring band passes easily around the projecting knife blade. When the retainer has been removed, the ring blade freely drops from the groove 58 so that it can be sharpened or replaced as necessary.

While a single embodiment of the invention has been illustrated and described in considerable detail, the present invention is not to be considered limited to the precise construction disclosed. Various adaptations, modifications and uses of the invention may occur to those skilled in the arts to which the invention relates. It is the intention to cover all such adaptations, modifications and uses falling within the scope or spirit of the annexed claims.

Having described my invention I claim:

1. A hand knife comprising:

a handle;

a ring-like blade housing carried by and projecting from said handle, said housing disposed about a central axis and having an axially facing side with an annular blade receiving groove defined in said axially facing side, said groove extending about said axis and opening in said axially facing side;

a ring blade disposed about said central axis and supported in said housing groove with a cutting edge projecting generally axially therefrom;

a blade drive transmission for driving said blade relative to said housing about said axis; and, a blade retention assembly comprising a flexible blade keeper extending along said axially facing housing side and about said blade in excess of 180 degrees about said axis, said blade retention assembly further comprising a connector for securing said blade keeper in substantially fixed relationship to said housing and said handle with said keeper disposed in supporting relationship with said blade along the housing face diametrically opposite said handle, said blade keeper flexing to enable removal and replacement of a ring blade from said housing groove.

2. The hand knife claimed in claim 1 wherein said blade housing comprises an annular blade support extending continuously about said axis.

3. The hand knife claimed in claim 1 wherein said keeper comprises a resiliently flexible spring band.

4. The hand knife claimed in claim 3 wherein said spring band extends substantially about said ring blade and defines opposite ends, one of which is secured to said handle by said connector.

5. The hand knife claimed in claim 4 further wherein said spring band second end is secured to said handle by a second connector.

6. The hand knife claimed in claim 4 wherein said spring band is resiliently flexible in a plane normal to said axis to enable said opposite ends to be moved resiliently toward and away from each other for removing and replacing said ring blade, said spring band stiffly resisting deflection in a direction parallel to said axis to assure said ring blade remains positioned in said groove and accurately aligned with said housing.

7. The hand knife claimed in claim 1 wherein said flexible keeper is cantilevered to said handle by said connector and projects to said blade housing face diametrically opposite from said handle, said keeper having a relatively low resistance to flexing forces acting in a plane transverse to said axis and a relatively high resistance to flexing forces acting in a direction parallel to said axis.

8. A hand knife comprising:

a handle;

a ring-like blade housing carried by and projecting from said handle, said blade housing disposed about a central axis and having an axially facing side with an annular blade receiving groove defined in said axially facing side, said groove extending about said axis and opening in said axially facing side;

a ring blade disposed about said central axis and supported in said housing groove with a cutting edge projecting generally axially therefrom;

a blade drive transmission for driving said blade relative to said housing about said axis; and, a blade retention assembly comprising a flexible blade keeper and a connector for securing said blade keeper with respect to said handle, said blade keeper extending in supporting relationship with said ring blade from a location adjacent said handle to a location diametrically opposed to said handle for maintaining said ring blade properly positioned in said housing groove.

9. The hand knife claimed in claim 8 wherein said blade keeper comprises a spring band having a circularly curved section remote from said handle.

10. The hand knife claimed in claim 2 wherein said keeper further comprises anchor pads formed at opposite ends of said spring band and disposed adjacent each other.

11. A hand knife comprising:

a handle;

a ring-like blade housing carried by said handle, said housing disposed about a central axis and having an axially facing side;

a ring blade disposed about said central axis and supported by said blade housing with a cutting edge projecting generally axially from said axially facing side;

a blade drive transmission for driving said blade relative to said housing about said axis; and, a blade retention assembly comprising a flexible blade keeper extending about said blade in excess of 180 degrees about said axis, said blade retention assembly further comprising structure for securing said blade keeper in substantially fixed relationship to said blade housing and said handle, said blade keeper engaging said ring blade for supporting said blade relative to said blade housing as said blade rotates about said axis, said blade keeper flexing as it is positioned for supporting said ring blade.

12. A hand knife comprising:

a handle;

a ring-like blade housing carried by and projecting from said handle, said blade housing disposed about a central axis and having an axially facing side with an annular blade receiving groove defined in said axially facing side, said groove extending about said axis and opening in said axially facing side;

a ring blade disposed about said central axis and supported in said housing groove with a cutting edge projecting generally axially therefrom;

a blade drive transmission for driving said blade relative to said housing about said axis; and, a blade retention assembly comprising a blade keeper cantilevered to said handle and a connector for securing said blade keeper to said handle, said blade keeper substantially encircling said blade and extending along said axially facing housing side in supporting relationship with said ring blade for maintaining said ring blade properly positioned in said housing groove, said blade keeper comprising a spring band having a circularly curved section remote from said handle.

* * * * *